United States Patent

Stann et al.

[11] Patent Number: 5,877,851
[45] Date of Patent: *Mar. 2, 1999

[54] SCANNERLESS LADAR ARCHITECTURE EMPLOYING FOCAL PLANE DETECTOR ARRAYS AND FM-CW RANGING THEORY

[75] Inventors: Barry Stann, Silver Spring; William C. Ruff, Baltimore; Zoltan G. Sztankay, Rockville, all of Md.

[73] Assignee: The United States of America as represented by the Secretary of the Army, Washington, D.C.

[*] Notice: The term of this patent shall not extend beyond the expiration date of Pat. No. 5,608,514.

[21] Appl. No.: 937,150

[22] Filed: Sep. 24, 1997

[51] Int. Cl.$^6$ ................. G01C 3/08; H04N 7/18
[52] U.S. Cl. .............. 356/5.09; 348/135; 356/5.04
[58] Field of Search .................. 356/5.09, 5.12, 356/5.13, 5.01, 5.04; 348/135

[56] References Cited

U.S. PATENT DOCUMENTS

| | | | |
|---|---|---|---|
| 3,647,298 | 3/1972 | Soules | 356/5.09 |
| 3,825,340 | 7/1974 | Debart | 356/5.09 |
| 4,240,746 | 12/1980 | Courtenay et al. | 356/5 |
| 4,935,616 | 6/1990 | Scott | 250/213 VT |
| 5,151,747 | 9/1992 | Nourrcier | 356/5.09 |
| 5,317,148 | 5/1994 | Gray | 250/227.26 |
| 5,345,304 | 9/1994 | Allen | 356/5 |
| 5,534,993 | 7/1996 | Ball et al. | 356/5.09 |
| 5,557,637 | 9/1996 | Glynn | 375/271 |
| 5,574,553 | 11/1996 | McManamon et al. | 356/5.15 |
| 5,608,514 | 3/1997 | Stann et al. | 356/5.09 |
| 5,638,164 | 6/1997 | Landau | 356/5.01 |
| 5,644,386 | 7/1997 | Jenkins et al. | 356/4.01 |

*Primary Examiner*—Stephen C. Buczinski
*Attorney, Agent, or Firm*—Paul S. Clohan; Frank J. Dynda

[57] ABSTRACT

A laser transmitter is amplitude modulated with a chirp signal to illuminate an entire scene or field of view. A mixing process occurs in the received light path using an electro-optic light modulator positioned just in front of the focal plane detector array. The detector array detects and integrates the mixed light signal over some field of view. Numerous image frames are recorded periodically in the time over the FM period. The Fourier transform taken over time for a pixel establishes the range to the target in that pixel. Performing the Fourier transform for all pixels yields a three-dimensional image of objects in the field of view. Such an arrangement yields a scannerless ladar possessing high range resolution with no range ambiguities.

25 Claims, 4 Drawing Sheets

SCANNERLESS LADAR ARCHITECTURE EMPLOYING FOCAL PLANE DETECTOR ARRAYS AND FM-CW RANGING THEORY

FIELD OF THE INVENTION

The present invention relates to laser ranging and detection (ladar) systems generally, and more particularly, to an incoherent ladar which achieves high range resolution employing focal plane detector arrays and FM/CW radar ranging theory.

BACKGROUND OF THE INVENTION

Reference is made to U.S. Pat. No. 5,608,514, (the '514 patent) issued Mar. 4, 1997 to the same inventors as the present application, assigned to the same assignee as the present application, and incorporated herein by reference. The '514 patent describes a technique for achieving high range resolution for a single pixel ladar by employing frequency modulation (FM) radar ranging principles.

Three-dimensional imaging of a scene is achieved by mechanically scanning the single pixel ladar or by building arrays of such ladars. To perform ranging on a single pixel, the ladar's laser transmitter is amplitude modulated with a radio-frequency subcarrier which itself is linearly frequency modulated. The target-reflected light is incoherently detected with photodiode and converted into a voltage waveform.

The voltage waveform is then mixed with an undelayed sample of the original laser amplitude modulation waveform. The output of the mixer is processed to remove "self clutter" that is commonly generated in FM ranging systems and obscures the true target signals. The clutter-free mixer output is then Fourier transformed to recover target range.

The '514 patent teaches the use of a single pixel ladar and does not teach or suggest the use of focal plane detector arrays similar to ones used in television cameras. Such focal plane detector arrays may be incorporated into a ladar to image scenes without mechanical scanning. "Characterization of a Scannerless Ladar System", Sandia National Laboratories, December, 1993, and Scott, U.S. Pat. No. 4,935,616, issued Jun. 19, 1990, both of which are incorporated herein by reference, describe a scannerless ladar system with a gain-modulated micro-channel plate image intensifier (one form of an electro-optic modulator) in front of a focal plane detector array. In such a system, the illumination source is an array of light emitting diodes which are amplitude modulated with a constant frequency sinusoid.

The same modulation as applied to the light emitting diodes is applied to the image intensifier. The intensifier effectively controls the amount of light reaching the detector array as a function of the relative phase between the modulation on the received light and the modulation applied to the intensifier. In the most basic sense, the signal processor maps pixel amplitude to this relative phase which is then used to estimate range to the target.

The Sandia Labs and Scott ladar systems will yield range ambiguities which are periodic with half of the wavelength of the modulation. The Sandia Labs and Scott ladar systems do not employ frequency modulation of the AM rate nor does it employ FM radar range-gate formation algorithms. As a result, range resolution may be limited.

SUMMARY OF THE INVENTION

The method and apparatus of the present invention may be applied to both two-dimensional and one-dimensional detector arrays of any number of detectors. In the present invention, the laser transmitter is modulated as in the '514 patent, but an entire scene or field of view is usually illuminated.

In the present invention, the mixing process occurs in the received light path using an electro-optic light modulator positioned just in front of the focal plane detector array and driven by the original laser modulation. The detector array detects and integrates the mixed light signal over some field of view. Numerous image frames are recorded periodically in the time over the FM period.

The Fourier transform taken over time for a pixel establishes the range to the target in that pixel. Performing the Fourier transform for all pixels yields a three-dimensional image of objects in the field of view. The present invention, using a focal plane detector array, electro-optical light modulator, and microwave circuit elements in conjunction with FM-CW radar ranging theory yields a scannerless ladar possessing high range resolution with no range ambiguities.

BRIEF DESCRIPTIONS OF THE DRAWINGS

DETAILED DESCRIPTION OF THE INVENTION

The purpose of the present invention is to capture high angular resolution and high range resolution images of scenes without the need for mechanical scanning of the ladar's laser or receiver beams. To achieve this, the present invention combines focal plane detector arrays, frequency modulation (FM) radar ranging principles, and electro-optic light modulators (a class of devices including gain-modulated image intensifiers, and quantum-well electro-optic light modulators).

Figure 1:
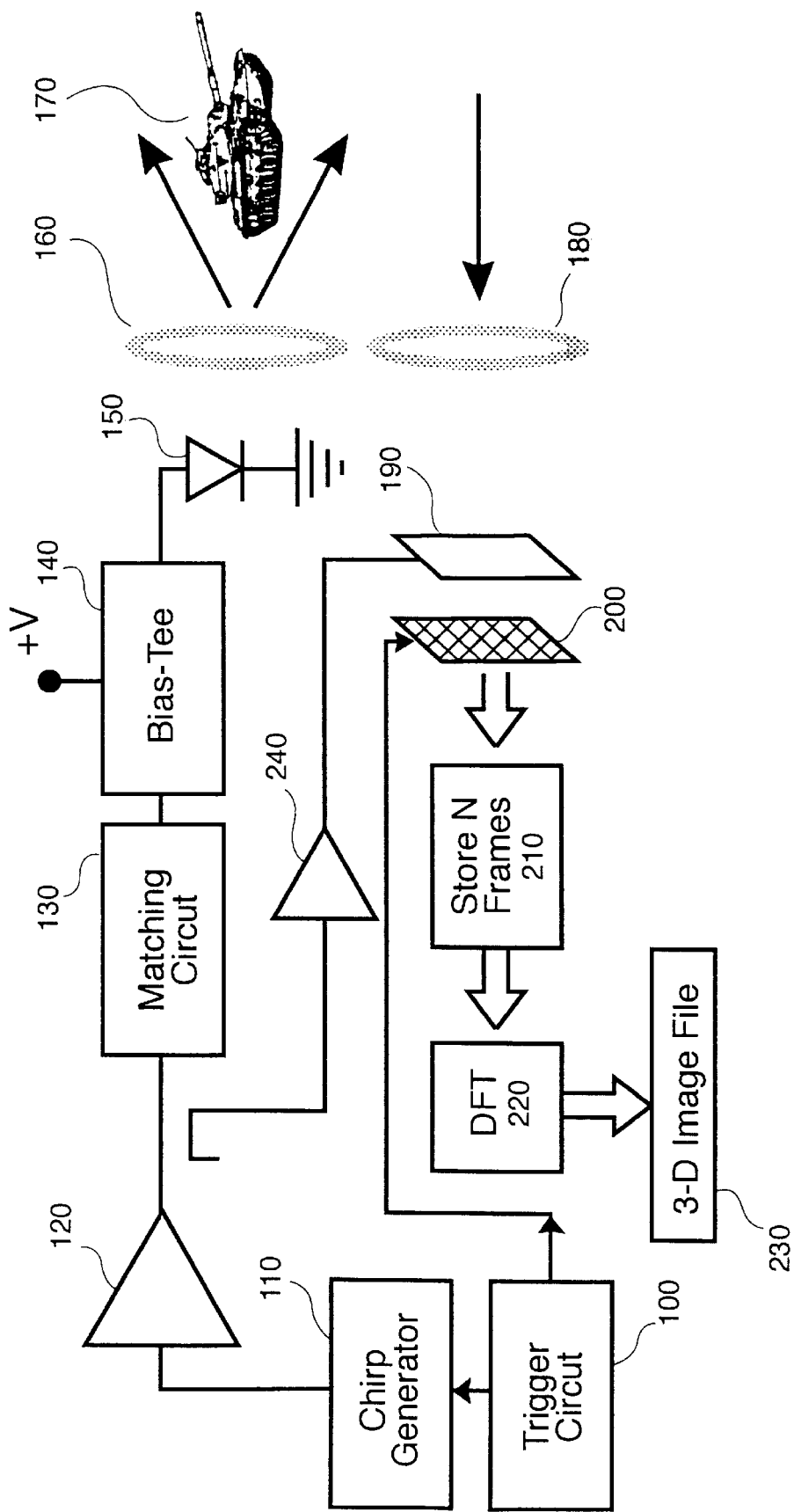
FIG. 1 is a basic electronic block diagram of the ladar architecture of the present invention.

A basic electronic block diagram of the ladar architecture of the present invention is illustrated in FIG. 1. In the preferred embodiment of the ladar of the present invention, trigger circuit 100 initiates generation of a linear frequency modulated sinusoidal chirp signal in chirp generator 110. The chirp signal will persist for some period T. A chirp signal is simply a sinusoidal waveform whose frequency linearly increases over T. Other modulation waveforms may also be used within the spirit and scope of the present invention.

The chirp signal has been chosen in the preferred embodiment as the signal processing required to form range gates is readily understood, and the processor has relatively low bandwidth which makes it easy to implement. Various commercial devices may be used to comprise chirp generator 110. For short-range high resolution applications, commercial oscillators using MMIC or hybrid technologies are usable. For long-range, high resolution applications, precision linear tuning characteristics are required, which means that YIG-tuned oscillators or direct digital frequency synthesis devices may be necessary.

For the ladar architecture described herein, the chirp signal may typically have a start frequency in the tens to low hundreds of megahertz and a stop frequency in the hundreds of megahertz or low gigahertz. The difference between the start and stop frequency, ΔF, is chosen to establish the desired range resolution, ΔR, according to the equation:

$$\Delta R = c/(2\Delta F) \qquad \text{EQ. 1}$$

where c is the velocity of light. For some semiconductor laser devices and electro-optic modulators, modulation bandwidths in the low tens of GHz are achievable.

The chirp signal is fed into a wideband RF power amplifier 120 which modulates the current driving semiconductor laser diode 150. Wideband Matching circuit 130 between wideband RF power amplifier 120 and semiconductor laser diode 150 matches the driving impedance of wideband RF power amplifier to semiconductor laser diode 150 over ΔF. Matching the driving impedance of the amplifier causes the light beam intensity to be highly amplitude modulated (AM) and causes the peak intensity to be constant as a function of chirp frequency. Output from wideband matching circuit 130 and a DC current +V are summed in bias tee 140 to provide the current drive for semiconductor laser diode 150 with a bandwidth at least equal to the chirp waveform.

A high percentage amplitude modulation of the light beam is desirable. Presently, commercial GaAs laser diodes are sold having advertised 1–2 GHz modulation bandwidths and output powers to 4 Watts. Such specifications will support ladar designs with resolutions less than 0.3 m and ranges to several kilometers. Laser diode 150 converts the chirp current waveform into a light waveform with power proportional to the driving current.

The divergent laser beam from semiconductor laser 150 is collected by a lens 160 which collimates the light in a beam sufficiently wide to encompass or floodlight the target scene of interest 170. Although the apparatus of FIG. 1 illustrates the preferred form of laser illumination, in some cases the laser beam may be made narrow and scanned to raise the power density on the target and thereby improve the ladar's signal-to-noise ratio.

A small portion of the laser light is reflected from target 170 back toward the ladar and collected by lens 180. Electro-optic light modulator 190 is driven by the original laser modulation waveform by tapping off a portion of the output of wideband RF power amplifier 120 and amplifying the signal through amplifier 240. Electro-optic light modulator 190 is located in the light path somewhere between lens 180 and focal plane detector array 200.

Electro-optic modulator 190 may be one of a variety of devices including image intensifiers, micro-channel plates, and preferably semiconductor quantum-well electro-absorption modulators. Any of these devices, however, must have a modulation bandwidth in the same microwave region as the original laser modulation and operate in the same optical band as semiconductor laser 150. Additionally, to efficiently utilize the power radiated by semiconductor laser 150, the modulation index of electro-optic modulator 190 should be substantial (i.e., 50% or greater).

At least in the prototype embodiment, it is envisioned that Electro-optic modulator 190 may comprise a reflective type device rather than the transmissive type of device illustrated in FIG. 1. Such a reflective device would modulate the incoming signal by selectively reflecting a portion thereof onto focal plane detector array 200.

Electro-optic modulator 190 modulates (mixes) the received light by the original chirp signal; the mixed light signal is then focused onto focal plane detector array 200.

Here, each photo-detector element in focal plane detector array 200 converts incident light power into an electric charge proportional to the integral of the light power taken over the sampling time of the array.

Amplifiers within focal plane detector array 200 convert the electric charge to produce a voltage proportional to the light energy. This voltage will be shown to represent a sample of the IF waveform normally recovered in FM radar systems. To collect a full IF waveform, focal plane detector array 200 collects data periodically along the chirp period and sends it to memory 210.

The data set in memory 210 contains, for each pixel, an intermediate frequency (IF) waveform which includes all of the magnitude, range, and phase information derived from the light reflected from scatterers in that pixel. The mean frequency, $f_{if}$, of the IF waveform is given by the equation:

$$f_{if} = \Delta F \left( \frac{\tau}{T} \right) \qquad \text{EQ. 2}$$

where τ is the round-trip time delay for the transmitted signal. Equation 2 follows from standard FM radar ranging theory. The expression for τ may be given as:

$$\tau = 2(D/c) \qquad \text{EQ. 3}$$

where D is the distance from the sensor to the target. Substituting this expression into the equation for $f_{if}$ yields $$f_{if} = 2\Delta F(D/(cT)) \qquad \text{EQ. 4}$$

which illustrates that the frequency of the IF waveform is directly proportional to the range to the target. From this it follows that the discrete Fourier transform performed over the IF waveform in each pixel will establish the range to all scatterers in the pixel and the respective magnitude and phase of the scatter's signal.

After the chirp is completed, the three-dimensional data set in memory 210 is passed to a signal processor 220 which forms range cells by performing the discrete Fourier transform on the time signal resident in each pixel. The transformed data set is a three-dimensional image file 230 of the original illuminated scene.

The above description discusses only the preferred embodiment of the ladar architecture of the present invention. Many other signal processing techniques may be used in FM radar which may be applied to achieve other ends within the spirit and scope of the present invention. Such techniques may include the use of alternate modulation waveforms (triangle waves, pseudo-random code, etc.) to simplify the formation of range cells or inhibit the detection of jamming signals or other operating sensors, IF amplifier limiting to effectively normalize the range response to any target return amplitude, the addition of "gates" to inhibit the detection of clutter and aerosols, and methods to determine whether a target is approaching or receding.

The present invention may employ readily available and inexpensive CW semiconductor laser diodes which may be amplitude modulated at rates to 2 GHz and recently developed vertical cavity surface emitting lasers that may be modulated at rates to the low tens of GHz. These devices when used in the invention ladar are operated at a 50% duty factor. This duty factor illuminates the target with a relatively high average power and enables the ladar to detect targets at substantial distances.

Incoherent ladars using pulse ranging must transmit high peak pulse powers using other laser technologies which may be less rugged to equal the average power obtainable with the invention ladar. The invention ladar also exploits the wide AM bandwidths of semiconductor laser diodes to achieve range resolutions as defined by radar standards to less than 1 cm. As an example, incoherent ladars using pulse technology would have to transmit pulses that are 60 ps long to obtain an equivalent resolution. Pulses of this length are hard to generate and further reduce the average transmitted power.

An expression for the output of a single detector in focal plane detector array 200 in terms of a general laser modulation waveform may be derived as follows. To begin, the laser modulation waveform, $I_m(t)$, can be generally expressed as, $$I_m(t)=I_x(t) \cos (\phi_x(t)) \qquad \text{EQ. 5}$$

where $I_x(t)$ represents the envelope modulation of $I_m(t)$ with changing time or modulation frequency and $\phi_x(t)$ represents the phase of the modulation. The total laser drive current, $I_d(t)$ is $$I_d(t)=I_o+I_x(t) \cos (\phi_x(t)) \qquad \text{EQ. 6}$$

where $I_o$ is the laser bias current. The laser drive current maps to laser light power, $P_l(t)$ according to the following equation, $$P_l(t)=k_l(I_o+I_x(t) \cos (\phi_x(t)) \qquad \text{EQ. 7}$$

where $k_l$ is a proportionality constant containing electrical to light conversion losses, collimating lens loses, and other factors. This light propagates to the target scene where some small fraction of the power is reflected back toward the ladar and collected by the receiver lens. This collected power, $P_{lr}(t)$, is expressed as $$P_{lr}(t)=k_r(I_o+I_x(t-\tau) \cos (\phi_r(t))) \qquad \text{EQ. 8}$$

where $\tau$ is the time delay for the light to propagate to the target and return, $\phi_r(t)$ is the received phase of the modulation, and $k_r$ is another proportionality constant which includes factors such as target reflectivity, space losses, and lens aperture and efficiency. The electro-optic modulator in the receiver light path is assumed to linearly attenuate the light power reaching the detector array according to the equation, $$L_{eo}(t)=k_m(V_m(t)) \qquad \text{EQ. 9}$$

where $k_m$ is a proportionality constant and $V_m(t)$ is the control voltage applied to the modulator.

It follows that the light power at the detector $P_{ld}(t)$ is simply $$P_{ld}(t)=P_{lr}(t)(L_{eo}(t))=P_{lr}(t)(k_m(V_m(t))) \qquad \text{EQ. 10}$$

Setting the control voltage equal to $$V_m(t)=(V_o+V_x(t) \cos (\phi_x(t)) \qquad \text{EQ. 11}$$

where $V_o$ is a bias voltage and $V_x(t)$ is the envelope of the control voltage, and substituting it and equation 8 into equation 10 yields $$P_{ld}(t)=k_m k_r(I_o+I_x(t-\tau) \cos (\phi_r(t)))(V_o+V_x(t) \cos (\phi_x(t))) \qquad \text{EQ. 12}$$

for the light signal impinging on the detector array. Performing the multiplications and using a trigonometric identity to expand the product of cosines yields $$P_{ld}(t)=I_o V_o+V_o I_x(t-\tau) \cos (\phi_r(t))+I_o V_x(t) \cos (\phi_x(t))$$
$$+I_x(t-\tau)V_x(t)(\tfrac{1}{2})[\cos (\phi_x(t)+\phi_r(t))+\cos (\phi_x(t)-\phi_r(t))] \qquad \text{EQ. 13}$$

where the proportionality terms have been dropped for simplicity.

A simple model for the detectors in a focal plane array assumes that each detector returns a voltage proportional to the integral of the incident light power over some small time interval, $\Delta t$. For most focal plane detector arrays, $\Delta t$ is 1 ms or greater. The second and third terms in equation 13, and the one containing the sum of the phase terms, are changing at microwave frequency rates, and therefore average to near zero over $\Delta t$.

As a result, the detectors will be responsive only to the first and phase difference terms in equation 13. Additionally, since the phase difference term will be made to vary only a small amount over $\Delta t$, the detector output, $V_d(t)$ can be approximated as $$V_d(t)=(I_o V_o+I_x(t-\tau)V_x(t)(\tfrac{1}{2})(\cos (\phi_x(t)-\phi_r(t))))\Delta t \qquad \text{EQ. 14}$$

Now the focal plane array periodically integrates the incoming light over $\Delta t$, sends the detector voltages to memory, and dumps the integrated voltage, some n times over the modulation period. Assuming no latency in transferring the voltages to memory and dumping the voltage, this yields a voltage sequence as a function of n for each detector or pixel in memory that can be expressed as $$V_d(n\Delta t)=(I_o V_o+I_x(n\Delta t-\tau)V_x(n\Delta t)(\tfrac{1}{2})(\cos (\phi_x(n\Delta t)-\phi_r(n\Delta t))))\Delta t \qquad \text{EQ. 15}$$

In the following analysis, the equations for the phase difference term in equation 15 is developed for linear FM and used to derive the IF signal at the detector output.

To begin, the frequency of the laser modulation or transmitted chirp waveform can be expressed as $$f(t)=f_o+(\Delta F/T)\cdot t - T/2 \leq T/2 \qquad \text{EQ. 16}$$

where $f_o$ is the center or carrier frequency of the chirp waveform. The phase of the transmitted chirp waveform is $$\phi_x(t) = \int_{-\infty}^{t} 2\pi(f_o + (\Delta F/T)\cdot t')dt' \qquad \text{EQ. 17}$$

while the phase of the received signal is, $$\Phi_r(t) = \int_{-\infty}^{(t-\tau)} 2\pi(f_o + (\Delta F/T)\cdot t')dt' \qquad \text{EQ. 18}$$

The phase difference between the transmitted and received signals is $$\Delta\phi(t) = \phi_x(t) - \phi_r(t) \qquad \text{EQ. 19}$$

or $$\Delta\Phi(t) = \int_{(t-\tau)}^{t} 2\pi(f_o + (\Delta F/T)\cdot t')dt' \qquad \text{EQ. 20}$$

Performing the integration and inserting the limits yields, $$\Delta\Phi(t) = 2\pi\left(f_o t + \left(\frac{\Delta F}{2T}\right)t^2\right) - \qquad \text{EQ. 21}$$

$$2\pi\left(f_o(t-\tau) + \left(\frac{\Delta F}{2T}\right)(t^2 - t\tau + \tau^2)\right)$$

Cancelling terms and dropping $\tau^2$ term because $\tau$ is set much less than T leaves $$\Delta\Phi(t) = 2\pi f_o \tau + 2\pi\left(\frac{\Delta F}{T}\right)\tau t \qquad \text{EQ. 22}$$

Equation 22 is substituted into equation 15 to yield the IF waveform at the detector output $$V_d(n\Delta t) = \qquad \text{EQ. 23}$$

$$\left(I_o V_o + I_x(n\Delta t - \tau)V_x(n\Delta t)\left(\frac{1}{2}\right)\cos\left(2\pi f_o \tau + 2\pi\left(\frac{\Delta 1F}{T}\right)\tau n\Delta t\right)\right)\Delta t$$

where $n\Delta t$ has replaced t. The detector output consists of a DC term that is proportional to $I_o V_o$ and a sinusoidal term that is modulated in amplitude by $I_x(n\Delta t-\Delta)V_x$ $(n\Delta t)$. The DC term is problematic because the conventional technique for forming range-gates (discussed in the following text) converts this term into a false target at zero range. To eliminate this problem and simplify the treatment of range-gate formation, the detector output is preprocessed to suppress the DC term using a digital highpass filter or similar technique.

The amplitude modulation term is caused by amplitude variations in the microwave responses of the ladar components including various microwave devices, the laser, and the E-O modulator. Because the percentage of AM on $I_x(n\Delta t-\tau)V_x(n\Delta t)$ is 20 percent or less for a good ladar design and the effect of this level of AM is minimal on range-gate formation, this term is set to unity. Applying these simplifying assumptions to equation 23 and normalizing the amplitude yields, $$V_d(n\Delta t) = \left(\cos\left(2\pi f_o \tau + 2\pi\left(\frac{\Delta F}{T}\right)\tau n\Delta t\right)\right) \qquad \text{EQ. 24}$$

An examination of equation 24 shows that the IF waveform is a cosine function whose argument contains two terms. The first is recognized as a fixed Doppler phase term which is proportional to the carrier frequency and time delay or distance to the target. The second term is a function of $n\Delta t$ or time and contains the frequency of $V_d(n\Delta t)$, $(\Delta F/T)\tau$ which is proportional to $\tau$ or distance to the target.

Figure 2:
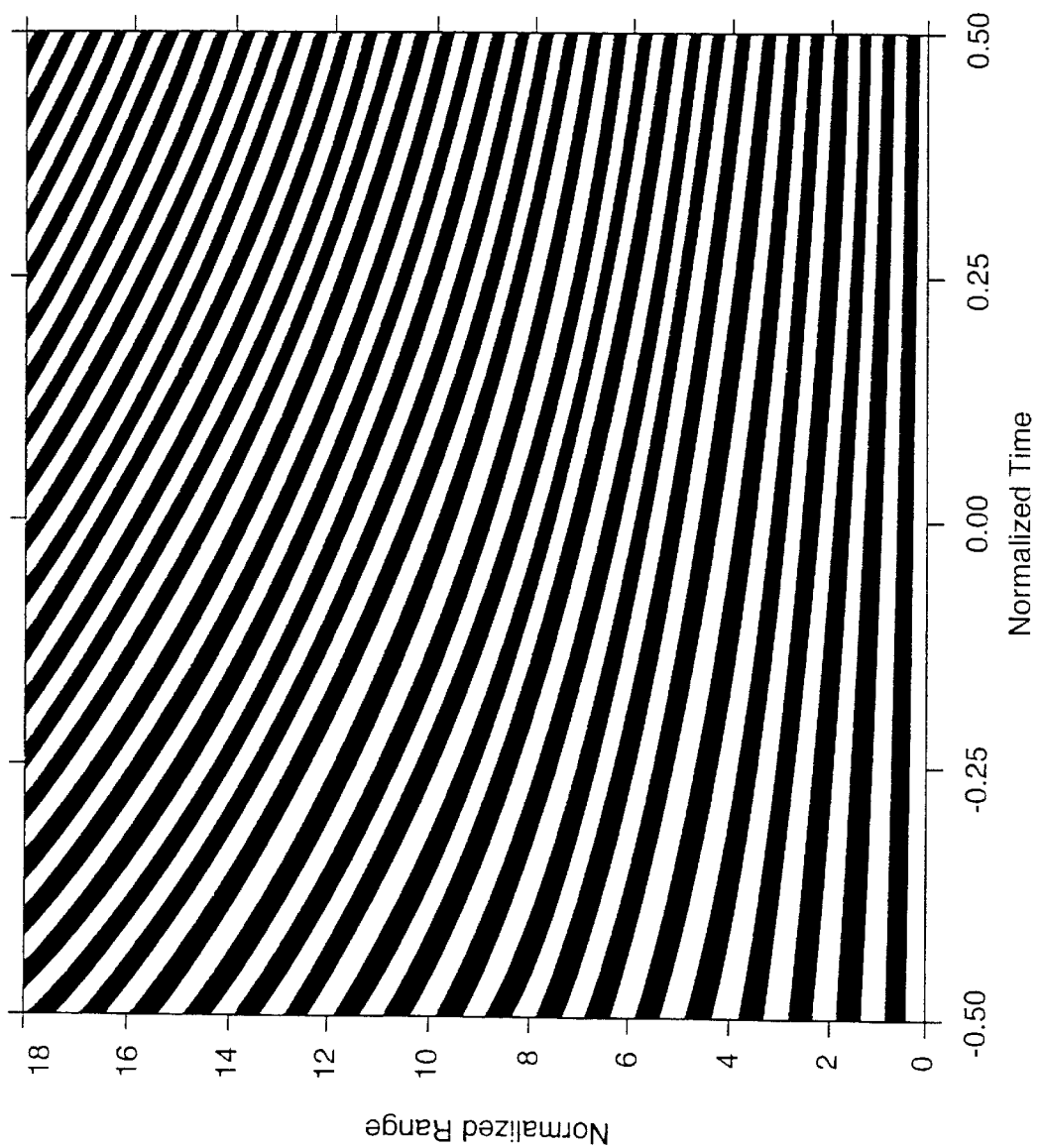
FIG. 2 is a plot of ladar IF signal $V_d(n\Delta t)$ as a function of normalized range, $\tau\Delta F$, and normalized $n\Delta t$ where the dark regions represent the minimum of $V_d(n\Delta t)$ and the bright regions represent the maximums.

FIG. 2 is a plot of this function as a function of normalized range, $\tau\Delta F$, and normalized $n\Delta t$ illustrating this behavior. Here the dark regions represent the minimum of $V_d(n\Delta t)$ and the bright regions represent the maximums. The important feature to notice is that the number of periods observed over normalized time or one sweep of the modulation increases proportionally with the normalized range.

From the discussion of equation 24, it follows that the target distance can be determined simply by measuring the frequency of $V_d(n\Delta t)$ over T. The usual method for determining the frequency content of a sampled waveform, $x(n)$ requires computing the discrete Fourier transform, $X(k)$ $$X(k) = \sum_{n=0}^{N-1} x(n)e^{-j2\pi nk} \qquad \text{EQ. 25}$$

The values of $X(k)$ are samples of the Fourier transform of the continuous representation of $x(n)$ or $x(t)$ at radian frequencies given by $2\pi(k/N)$. The Fourier transform of a continuous representation of equation 24 is $$F(f) = \frac{1}{T}\int_{-\frac{T}{2}}^{\frac{T}{2}} \cos 2\pi\left(f_o \tau + \left(\frac{\Delta F}{T}\right)\tau t\right)\cdot e^{-j2\pi ft}dt \qquad \text{EQ. 26}$$

Performing the integration yields, $$F(f) = e^{j2\pi f_o \tau} \cdot \qquad \text{EQ. 27}$$

$$\sin\frac{\left(\pi\left(\Delta F\left(\frac{\tau}{T} - f\right)T\right)\right)}{\left(\pi\left(\Delta F\frac{\tau}{T} - f\right)T\right)} + e^{(-j)2\pi f_o \tau} \cdot \frac{\sin\left(\pi\left(\Delta F\frac{\tau}{T} + f\right)T\right)}{\left(\pi\left(\Delta F\frac{\tau}{T} + f\right)T\right)}$$

To determine the discrete Fourier transform, samples of $F(f)$ are taken which occur at integer multiples of $1/T$ (which is equivalent to samples taken at $2\pi(k/N)$ in equation 25). This is accomplished by replacing f in equation 27 with $k/t$ yielding, $$F(k/T) = e^{j2\pi f_o \tau} \cdot \qquad \text{EQ. 28}$$

$$\frac{\sin(\pi(\Delta F\tau - k))}{\pi(\Delta F\tau - k)} + e^{(-j)2\pi f_o \tau} \cdot \frac{\sin\pi(\Delta F\tau + k)}{\pi(\Delta F\tau + k)}$$

Each complex output sample of the transform represents the magnitude and phase of the respective harmonic frequency components of the IF waveform. The exponential terms in equation 28 represent the Doppler component present in each harmonic line while the $\sin(x)/x$ term represents the amplitude of the Doppler component. For k greater than three or four, the second major term can be ignored because it is much smaller than the first. Examining the first major term shows that each harmonic component of $F(k/T)$ has a maximum for $$\Delta F\tau = k \qquad \text{EQ. 29}$$

which means that the output samples of the discrete Fourier transform have been mapped to discrete normalized ranges. Equivalently each output sample corresponds to a range-gate.

Figure 3:
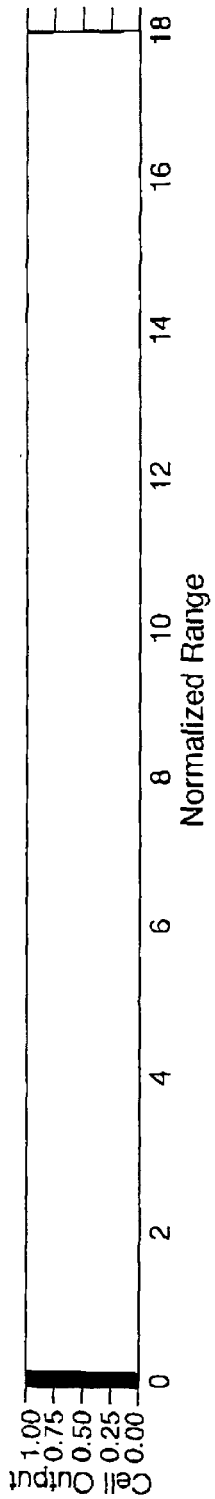
FIG. 3 is a series of plots illustrating the magnitude of the maximum of each harmonic component as a function of k for targets positioned at increasing normalized range.
Figure 3:
Figure 3:
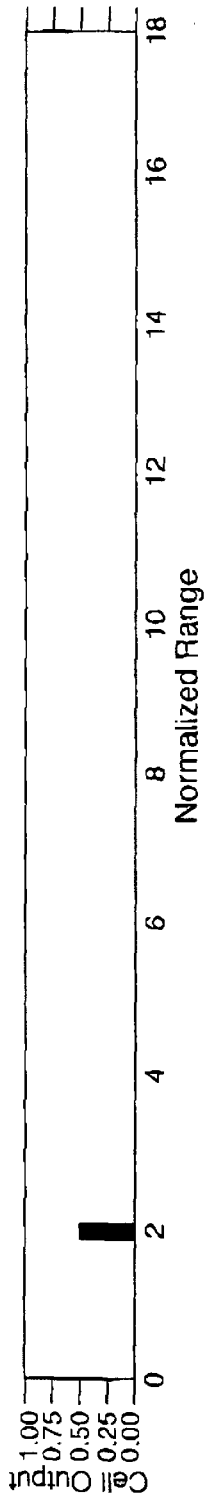
Figure 3:
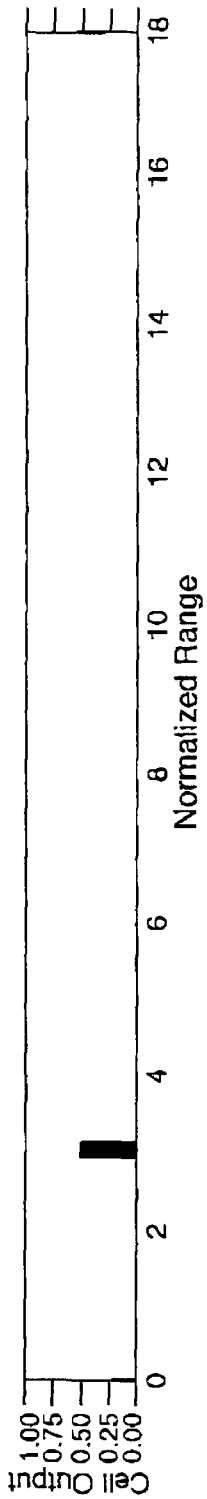
Figure 3:
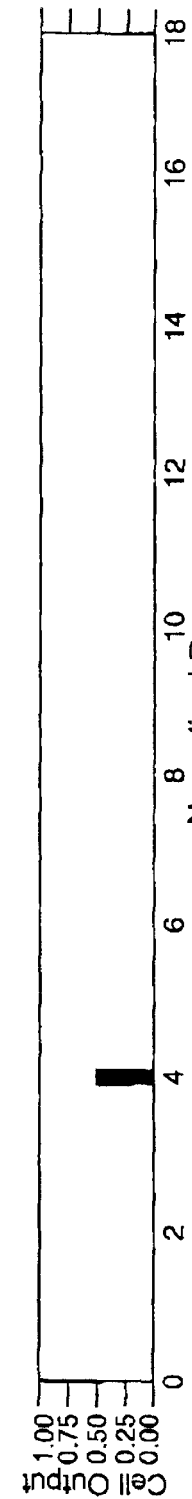

FIG. 3 plots the magnitude of equation 29 as a function of k for targets positioned at increasing normalized range. As an example, the top plot shows the magnitude of equation 29 for a target positioned at a normalized range of zero. As expected the target signal appears in the first harmonic line (first range-gate), which corresponds to a normalized range of zero. For plots below the top one, the normalized range of the target is successively increased by one and the indicated position of the target correspondingly increases.

Figure 4:
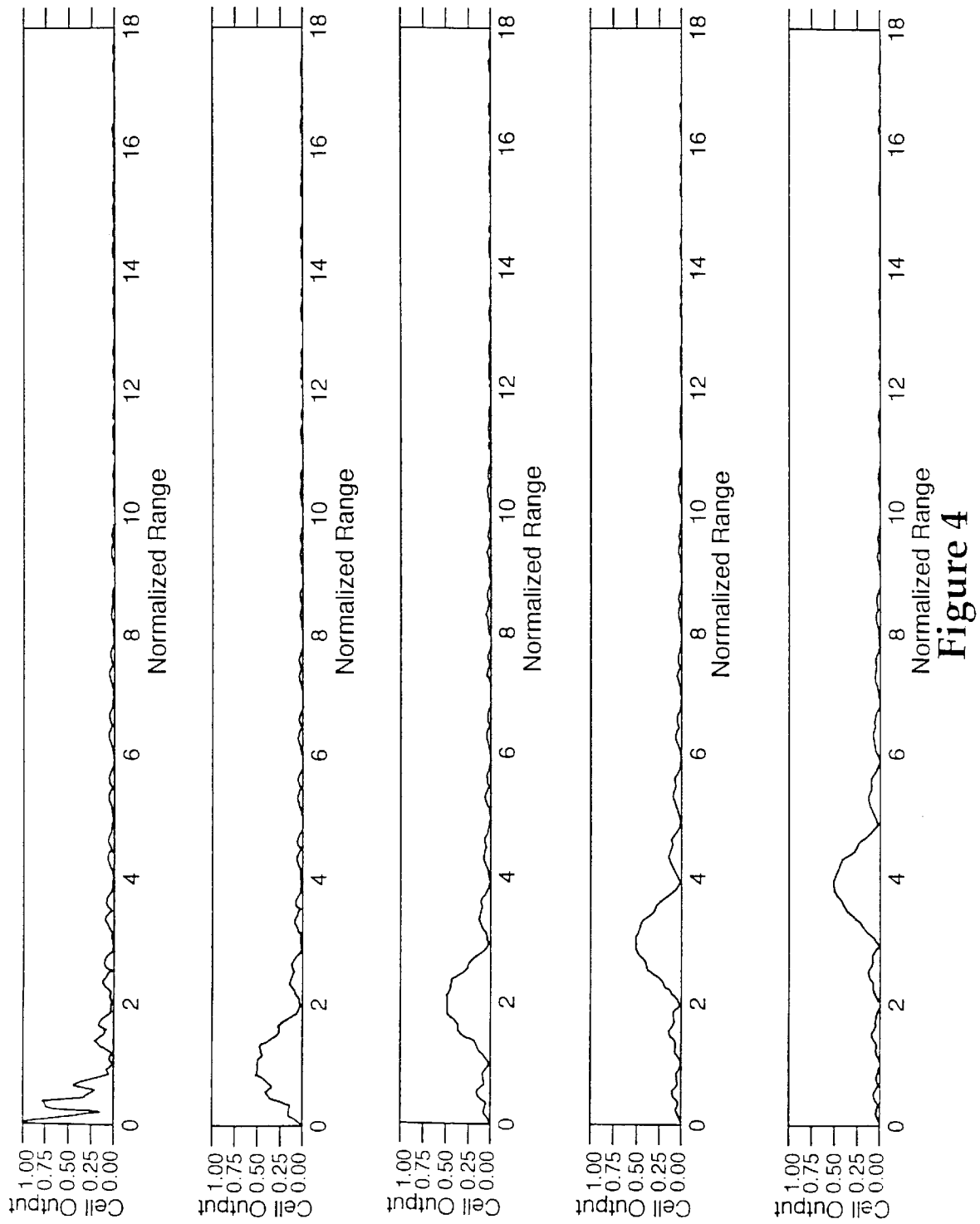
FIG. 4 is a series of range response plots illustrating how the individual harmonic lines or range-gates behave as the normalized target range moves from 0 to 18.

FIG. 4 shows how the individual harmonic lines or range-gates or equation 29 behave as the normalized target range moves from 0 to 18. These plots are called range responses. For instance, the top plot shows the magnitude of the first range-gate (harmonic number=0) as a function of target range. As expected the magnitude of this range-gate is maximum at zero range and decreases with increasing range.

The rapid modulation in the basic sin x/x shape of the function is caused by the second major term in equation 29 that is still strong at small k. For plots successively below the top plot, the harmonic number is increased by one. As expected the peak of the range response moves out in range one-for-one with increasing harmonic number. Also noted is the fact that the shape of each response becomes more sin x/x in shape as n increases.

The notion of range resolution can now be established from one of the higher harmonic number range responses. From these responses, the normalized distance between the 0.64 levels of the main lobe of the range response is equal to 1, which means that $$\Delta F \Delta \tau = 1 \qquad \text{EQ. 30}$$

Setting the resolution, $\Delta R$ equal to $c\Delta\tau/2$ and substituting into equation 18 yields $$\Delta R = c/(2\Delta F) \qquad \text{EQ. 31}$$

Thus, in the present invention, the light signal from semiconductor laser diode 150 is amplitude modulated (e.g., switched) using a frequency modulated (FM) chirp signal, such that the pulse width of the light signal varies with time. The received signal reflected from the target will demonstrate a slight delay when compared to the transmitted signal. Electro-optic modulator 190 effectively compares the return signal with the transmitted signal by multiplying the two together, resulting in a difference frequency signal $V_d(n\Delta t)$, which, as illustrated in equation 24 contains a frequency proportional to range to the target. Determination of this frequency establishes range to the target.

As illustrated in FIGS. 3 and 4, range resolution remains relatively constant throughout the effective range of the apparatus. Enhanced range resolution, using the FM-CW ranging technique of the present invention, allows for enhanced 3-D imaging using ladar, and also provides better immunity to noise and atmospheric interference.

Range resolution refers to the ability of the ladar to resolve individual elements at a particular range. The lower the range resolution of the ladar, the more difficult it is for the ladar to distinguish between closely spaced target objects, or between a single target and background noise, atmospheric interference (e.g., rain, fog, or other forms of precipitation, smoke, haze, and the like). In the latter situation, a low resolution ladar collects light from all scatters in a range cell and thus reflections from the interference factors (e.g. fog) may overwhelm reflections from a target subject.

The higher range resolution of the present invention allows smaller areas to be resolved in range, and thus a target (such as illustrated in FIG. 1) will tend to stand out over noise or atmospheric interference. As a result, not only will target ranging be possible, but also target 3-D imaging and resolution. 3-D imaging of a target may be used to help identify a target using shape identifying techniques known in the art for conventional video target identification systems and the like.

Although the prior art '514 patent illustrates the use of a chirp signal, such use was not in conjunction with an electro-optical modulator and focal plane array so as to generate high range resolution for 3-D images without mechanical scanning. Similarly, the prior art Sandia labs ladar system may employ a type of modulator, however, such a system does not use a chirp generator (FM modulation) but rather relies upon measuring phase difference using a constantly modulated signal. Phase difference, while an indicia of range, may not accurately measure range, as any phase difference greater than one wavelength may be indeterminate.

While the preferred embodiment and various alternative embodiments of the invention have been disclosed and described in detail herein, it may be apparent to those skilled in the art that various changes in form and detail may be made therein without departing from the spirit and scope thereof.

For example, although illustrated herein as a "chirp" signal (a repetitive signal having a steadily increasing frequency over time) other types of frequency-varying signals may be used to generate a frequency difference signal proportional to range without departing from the spirit and scope of the present invention. For example, a signal having a frequency which alternately increases and decreases over time may be used, and in fact may be contemplated for initial embodiments of the present invention.

Alternately, a pseudo-random code may be used in place of a chirp signal to generate a signal having a wide bandwidth. Such a pseudo-random code may use an appropriate matched filter to extract range information much as a Discrete Fourier Transform (DFT) is used as a matched filter for a sinusoid (e.g., chirp signal) to extract range information. Thus, the apparatus of the present invention may be suitably modified to use other types of frequency varying signals to drive the light source.

What is claimed is:

1. A high range-resolution 3-D imaging ladar comprising:
    a chirp generator for generating a chirp waveform;
    a bias tee, coupled to the chirp generator, a DC current source, and a semiconductor laser diode, said bias tee for summing the chirp waveform with the DC current source to provide a current drive for the semiconductor laser diode with a bandwidth at least equal to the chirp waveform;
    the semiconductor laser diode, coupled to the bias tee, for receiving the current drive and outputting a light signal toward a target; and
    an electro-optic light modulator, coupled to, and driven by the chirp generator, for receiving and modulating a reflected light signal from the target in accordance with the chirp waveform to output a modulated light signal.

2. The high range-resolution 3-D imaging ladar of claim 1, wherein the modulated light signal comprises a product of the reflected light signal from the target and the chirp waveform, the product comprising a difference frequency signal whose frequency is proportional to range to the target.

3. The high range-resolution 3-D imaging ladar of claim 2, further comprising:
    a wideband RF power amplifier, coupled to the chirp generator, for receiving and modulating the chirp waveform and outputting an amplified chirp waveform for summing in the bias tee.

4. The high range-resolution 3-D imaging ladar of claim 3, further comprising:
    an impedance matching circuit, coupled to the wideband RF amplifier, for matching driving impedance of the wideband RF power amplifier to the semiconductor laser diode over a range of the amplified chirp signal frequency such that light beam intensity from the semiconductor laser diode is highly amplitude modulated (AM) and the peak intensity of the light signal is constant as a function of chirp frequency.

5. The high range-resolution 3-D imaging ladar of claim 2, further comprising:
    a focal plane detector array, receiving the modulated light signal and outputting a frame of image data.

6. The high range-resolution 3-D imaging ladar of claim 5, further comprising:
    a trigger circuit for generating a trigger signal for triggering and synchronizing the chirp generator and the focal plane detector array.

7. The high range-resolution 3-D imaging ladar of claim 6, further comprising:

a memory, coupled to the focal plane detector array, for storing a plurality of frames of image data.

8. The high range-resolution 3-D imaging ladar of claim 7, further comprising:

computing means, coupled to the memory, for performing a discrete fourier transform on the plurality of frames of image data and outputting results of the discrete fourier transform as a 3-D image file.

9. A method for generating a high range-resolution 3-D image using ladar comprising the steps of:

generating a chirp waveform, summing the chirp waveform with a DC current source to provide a current drive for a laser diode, outputting, from the laser diode using the current drive, a light signal toward a target, and modulating a reflected light signal from the target in accordance with the chirp signal to output a modulated light signal.

10. The method of claim 9, wherein the modulated light signal comprises a product of the reflected light signal from the target and the chirp waveform, the product comprising a difference frequency signal whose frequency is proportional to range to the target.

11. The method of claim 10, further comprising the step of:

modulating the chirp waveform and outputting an amplified chirp signal for summing with the DC current source.

12. The method of claim 11, further comprising the step of:

matching driving impedance of the amplified chirp signal to a semiconductor laser diode over a range of the amplified chirp signal frequency such that light beam intensity from the semiconductor laser diode is highly amplitude modulated (AM) and the peak intensity of the light signal is constant as a function of chirp frequency.

13. The method of claim 12, further comprising the step of:

receiving, in a focal plane detector array, the modulated light signal and outputting a frame of image data.

14. The method of claim 10, further comprising the step of:

generating a trigger signal for triggering and synchronizing the chirp waveform and the focal plane detector array.

15. The method of claim 14, further comprising the step of:

storing, in a memory coupled to the focal plane detector array, a plurality of frames of image data.

16. The method of claim 15, further comprising the steps of:

performing a discrete fourier transform on the plurality of frames of image data, and outputting results of the discrete fourier transform as a 3-D image file.

17. An apparatus comprising:

first means for generating a waveform having a varying frequency;

second means for generating a constant current;

third means, coupled to the first means and the second means for summing the waveform having a varying frequency with the constant current to generate a current drive signal;

means for generating a light signal, coupled to the third means, for receiving the current drive signal and outputting a light signal proportional to the current drive signal toward a target; and means for receiving and modulating a reflected light signal from the target in accordance with the waveform having a varying frequency to output a modulated light signal.

18. The apparatus of claim 17, wherein the modulated light signal comprises a product of the reflected light signal from the target and the waveform having a varying frequency, the product comprising a difference frequency signal whose frequency is proportional to range to the target.

19. The apparatus of claim 18, further comprising:

amplifying means, coupled to the first means, for receiving and modulating the chirp waveform and outputting an amplified chirp waveform for summing in the second means.

20. The apparatus of claim 19, further comprising:

impedance matching means, coupled to the amplifying means, for matching driving impedance of the amplifying means to the means for generating a light signal over a range of the amplified chirp signal frequency such that light beam intensity from the means for generating a light signal is highly amplitude modulated (AM) and the peak intensity of the light signal is constant as a function of chirp frequency.

21. The apparatus of claim 17, further comprising:

light receiving means for receiving the modulated light signal and outputting ranging data.

22. The apparatus of claim 21, wherein said light receiving means comprises a focal plane detector array for outputting a frame of image data.

23. The apparatus of claim 22, further comprising:

a trigger circuit for generating a trigger signal for triggering and synchronizing the first means and the focal plane detector array.

24. The apparatus of claim 23, further comprising:

a memory, coupled to the focal plane detector array, for storing a plurality of frames of image data.

25. The apparatus of claim 24, further comprising:

computing means, coupled to the memory, for applying a matched filter to the plurality of frames of image data and outputting results of the matched filter as a 3-D image file.

* * * * *